(12) United States Patent
Koester

(10) Patent No.: US 7,469,708 B2
(45) Date of Patent: Dec. 30, 2008

(54) UNIVERSAL FLUID VALVE BODY

(75) Inventor: David John Koester, Gladbrook, IA (US)

(73) Assignee: Fisher Controls International LLC, St. Louis, MO (US)

( * ) Notice: Subject to any disclaimer, the term of this patent is extended or adjusted under 35 U.S.C. 154(b) by 252 days.

(21) Appl. No.: 11/018,468

(22) Filed: Dec. 21, 2004

(65) Prior Publication Data

US 2006/0130899 A1    Jun. 22, 2006

(51) Int. Cl.
*F16K 27/00* (2006.01)
(52) U.S. Cl. .................. 137/269; 137/602; 251/366
(58) Field of Classification Search ......... 137/269–271, 137/602, 891, 883; 251/366
See application file for complete search history.

(56) References Cited

U.S. PATENT DOCUMENTS

| | | | | |
|---|---|---|---|---|
| 1,841,275 A | 1/1932 | Baptiste | | |
| 2,000,910 A | 5/1935 | Appel et al. | | 15/137 |
| 2,771,219 A | 11/1956 | Dewey | | 222/93 |
| 2,792,856 A | 5/1957 | Coppage | | 141/362 |
| 3,105,612 A | 10/1963 | Krasnoff et al. | | 222/78 |
| 3,370,612 A | 2/1968 | Holl | | |
| 3,613,698 A | 10/1971 | Fox | | 132/84 |
| 3,739,804 A * | 6/1973 | Dubreuil | | 137/269 |
| 3,860,147 A | 1/1975 | Vessio et al. | | 222/96 |
| 4,303,110 A | 12/1981 | Chen | | 141/362 |
| D267,060 S | 11/1982 | Iwamoto | | D6/87 |
| 4,416,222 A * | 11/1983 | Staats | | 137/590 |
| 4,508,240 A | 4/1985 | Arango | | 222/96 |
| 4,570,829 A | 2/1986 | Allen | | 222/181 |
| 4,600,126 A | 7/1986 | Arango | | 222/82 |
| 4,632,146 A * | 12/1986 | Looney | | 137/539.5 |
| 5,033,499 A * | 7/1991 | Patel et al. | | 137/269 |
| 5,103,560 A | 4/1992 | Podolsky | | 30/41 |
| 5,482,187 A | 1/1996 | Poulsen et al. | | 222/207 |
| 5,845,670 A * | 12/1998 | Life | | 137/270 |
| 6,027,273 A | 2/2000 | Li | | 401/190 |
| 6,926,249 B2 * | 8/2005 | Erickson et al. | | 251/122 |

FOREIGN PATENT DOCUMENTS

| | | |
|---|---|---|
| DE | 3712802 | 6/1988 |
| GB | 111 538 | 12/1917 |
| GB | 867 059 | 5/1961 |

OTHER PUBLICATIONS

*Type D2 FloPro™ Control Valve*, Emerson Process Management Product Bulletin 51.2:D2, Sep. 2003, 1 page.

(Continued)

*Primary Examiner*—Kevin L Lee
(74) *Attorney, Agent, or Firm*—Hanley, Flight & Zimmerman, LLC

(57) ABSTRACT

Universal fluid valve body apparatus and articles of manufacture are disclosed. An example fluid control valve body includes opposing first and second openings and opposing third and fourth openings. Each of the third and fourth openings is disposed at a respective angle to at least one of the first and second openings and one of the third and fourth openings is configured to enable the fluid control valve body to be mounted directly to a vessel.

14 Claims, 4 Drawing Sheets

OTHER PUBLICATIONS

*Type 357 Control Valve*, Fisher Controls Product Bulletin 51.2:357, May 2002, 1 page.
*1" Non-Freeze Dump Valve*, Kimray, Inc. Product Bulletin E1:60.1, Rev.1 Issued May 1989, Oklahome City, 1 page.
*Series 2026/2027A/2028/2029 No Freeze Control Valve*, Norriseal Catalog Section 2, Bulletin 2-3, Mar. 2000, 1 page.
*Model 5127 "Freezeless" DumpValve*, Mallard Control Company, Inc., Apr. 2003, 1 page.

Submitted herewith is the International Search Report in corresponding PCT Application Serial No. PCT/US2005/039863, dated Mar. 6, 2006, 4 pages.

Submitted herewith is the Written Opinion of the International Searching Authority in corresponding PCT Application Serial No. PCT/US2005/039863, dated Mar. 6, 2006, 5 pages.

* cited by examiner

UNIVERSAL FLUID VALVE BODY

FIELD OF THE DISCLOSURE

The present disclosure relates generally to a valve body for a fluid valve and, more particularly, to a valve body that can be configured for use with a globe valve, an angle valve, and a vessel mounted valve.

BACKGROUND

Control valves are used to control the flow of a gas, a liquid, and/or any other substance through the pipes and/or vessels to which they are connected. A control valve is typically composed of one or more inlets, one or more outlets, and may include a sleeve-like cage in which a valve plug operates to control fluid flow through apertures that fluidly couple the inlet(s) to the outlet(s). The valve plug is typically part of a bonnet assembly that is mechanically coupled (e.g., bolted, clamped, threaded into, etc.) to the valve body. An example control valve assembly is disclosed in U.S. Pat. No. 6,701,958, which is hereby incorporated by reference.

Control valves may be adapted to suit particular applications. Four common control valve types are the globe valve, the angle valve, the tee valve, and the vessel mounted valve. These four control valve types perform similar control functions, but are adapted for use in particular control applications.

A globe valve typically includes an inlet port or opening and an outlet port or opening aligned along a common flow axis. A globe valve also typically includes a valve bonnet assembly that is mounted to a third opening, which may be aligned along an axis that is perpendicular or at some other angle to the flow axis of the inlet and outlet ports. U.S. Pat. No. 6,701,958 referred to above describes an example of a globe valve assembly. A globe valve is typically used in applications in which a substantially straight-through flow path is desirable (e.g., if a valve is to be mounted in-line along a span of pipe).

An angle valve typically includes a first valve body opening, which is typically used as an inlet, disposed at an angle to a second valve body opening, which is typically used as an outlet. An angle valve also includes a valve bonnet assembly mounted to a third valve body opening that is aligned with the axis of either the inlet port or the outlet port or that is at an angle with respect to either the inlet port or the outlet port. An angle valve is typically used in applications where it is necessary to protect the valve body from erosion or flashing damage.

A tee valve is a hybrid or combination of a globe valve configuration and an angle valve configuration. A tee valve typically includes three ports each of which can be configured as an inlet or an outlet. Two of the ports are typically arranged in a coaxial configuration, while the flow axis of the other port is disposed at an angle relative to the flow axis of the two coaxial ports. A tee valve typically also includes a valve bonnet assembly mounted to a fourth valve body opening. A tee valve can be configured to function as a globe valve by plugging the port having a flow axis at an angle to the flow axis of the two coaxial ports.

A vessel mounted or non-freeze valve is configured similarly to an angle valve. Similar to an angle valve, a vessel mounted valve typically includes an inlet port and an outlet port having a flow axis at an angle relative to the flow axis of the inlet port. A vessel mounted valve also typically includes a third opening configured to accept a valve bonnet assembly. Additionally, vessel mounted valves are configured to be mounted directly to a vessel (i.e., without requiring any serially interposing piping, fittings, etc.) and may include threads external to the valve body for engagement with the internal threads of an aperture (e.g., a fitting) of the vessel to which the valve is to be mounted. In contrast to other valve types, the valve seat within a non-freeze valve is located near to the port that is mechanically coupled to the vessel. In this manner, the valve seat is exposed to the warmer temperatures of the vessel to which the valve is attached, thereby minimizing or eliminating the possibility of the valve seat freezing.

Thus, each of the four above-described valve types is capable of being used in one application or two different applications (e.g., in the case of the tee valve, which can be used as a globe valve or an angle valve depending on where the port plug is installed). However, none of the above-described types of valves enables flexible configuration of a valve body or assembly for use in vessel mounted (e.g., non-freeze) applications as well as angle valve and globe valve applications. As a result, valve manufacturers must purchase tooling and provide manufacturing facilities for at least the four different valve types described above. In addition, valve installers, maintenance personnel, etc. may be required to purchase and maintain a supply of four different types of valves to service such valves installed in a process plant.

SUMMARY

In one example embodiment, a fluid control valve body includes opposing first and second openings and opposing third and fourth openings. In the example embodiment, each of the third and fourth openings is disposed at a respective angle to at least one of the first and second openings and one of the third and fourth openings is configured to enable the fluid control valve body to be mounted to a vessel.

In another example embodiment, a valve body includes first, second, third and fourth fluidly coupled openings. In the example embodiment, a distal end of at least one of the openings is configured to enable the valve body to be mounted directly to a vessel.

DETAILED DESCRIPTION

In general, the example fluid control valve body described herein includes four internally threaded openings. More specifically, each of first and second opposing openings is disposed at respective angles to opposing third and fourth openings. In the disclosed example, the first and second openings may have a substantially orthogonal relationship to the third and fourth openings. Further, each of the openings may include an internally threaded portion configured to engage with threaded pipe, a threaded plug or cap, and/or a bonnet assembly. At least one of the openings also includes an externally threaded distal end that enables the valve body to be directly engaged with a threaded aperture of a vessel such as, for example, a tank, a bottle, a cylinder, etc. Of course, one of ordinary skill in the art will recognize that the internally threaded portions may be replaced by any other means for attaching pipes, plugs, and/or a bonnet assembly such as, for example, a flange configured for bolting the parts together.

In contrast to known valve bodies such as non-freeze valve bodies and tee valve bodies, the example fluid control valve body provides a single valve body that can be flexibly configured for use a globe valve, a vessel mounted valve, and an angle valve. In particular, a threaded plug may be installed in one of the internally threaded openings, a bonnet assembly may be coupled to another of the internally threaded openings, and the remaining two openings may be used as fluid inlet and outlet openings respectively. For example, the example valve body described herein may be configured as a vessel mounted valve by installing the externally threaded opening into a vessel, installing a bonnet assembly in the opening opposite the externally threaded opening, installing a threaded plug or cap in one of the two remaining openings, and coupling the remaining opening as a fluid control inlet or outlet. Alternatively, the example valve body described herein may be configured for use as a globe valve by installing a threaded plug or cap in the internally threaded portion of the opening having the external threads, installing a bonnet assembly in the port opposite the opening having the external threads, and using the remaining two opposing openings as inlet and outlet ports.

Figure 1:
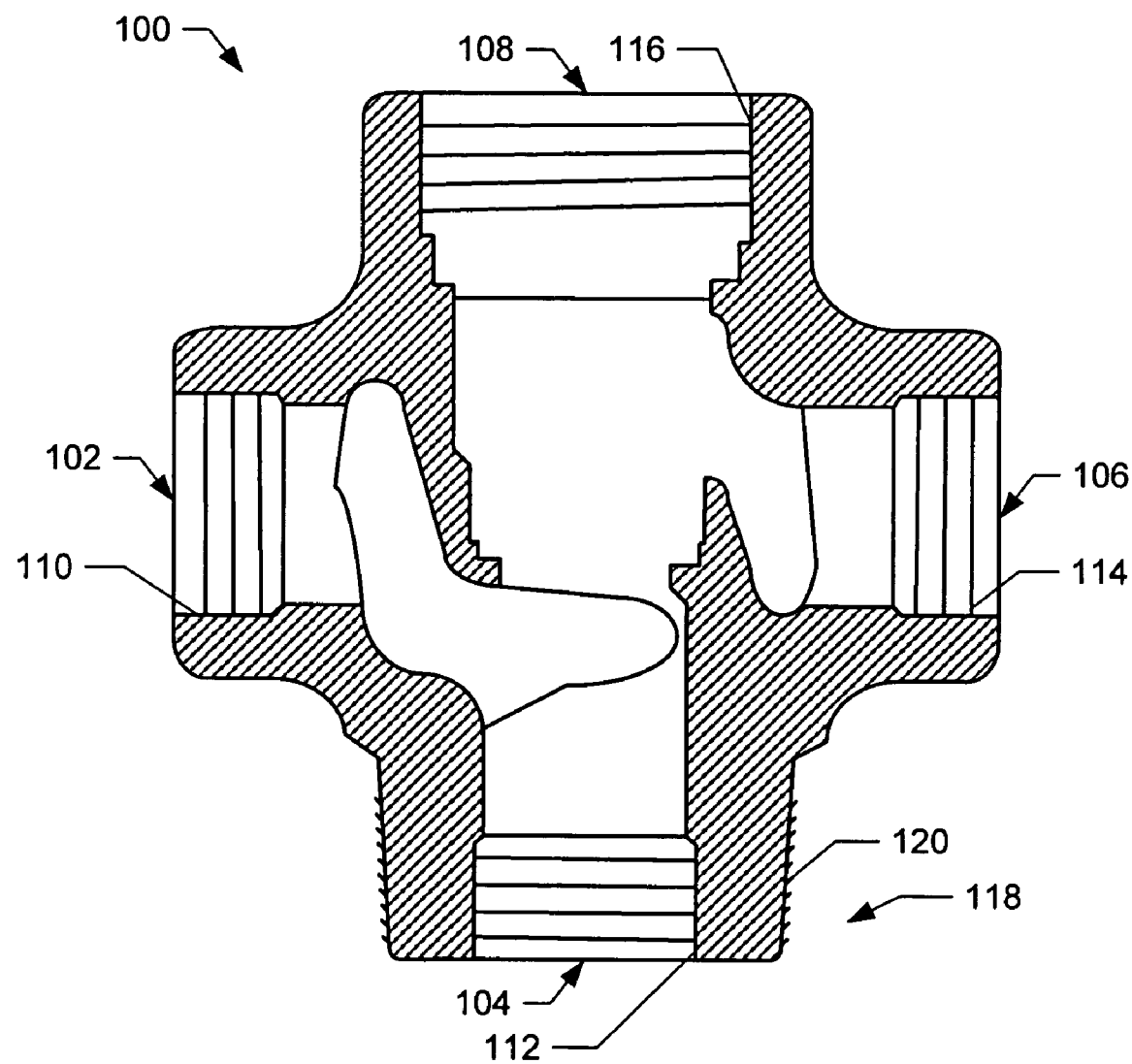
FIG. 1 is a cross-sectional view of an example universal valve body with threaded end connections.

FIG. 1 is a cross-sectional view of an example valve body 100 with universal threaded end connections. In general, the example valve body 100 may be used in a process to control the flow of a fluid (e.g., a liquid, a gas, etc.) Thus, the example valve body 100 may be incorporated in a control valve that is used as part of a process control system to open a flow path, close a flow path, and/or vary the size of an opening or restriction associated with a flow path, thereby controlling the flow rate and/or pressure of a process fluid passing through the control valve.

As shown in FIG. 1, the example valve body 100 includes openings 102, 104, 106, and 108, all of which are fluidly coupled as shown. For purposes of clarity in this example, hereinafter the openings 102 and 104 will be referred to as the inlet ports 102 and 104 and the opening 106 will be referred to as the outlet port 106. However, one of ordinary skill in the art will recognize that the openings 102, 104, and 106 may be interchangeably used as inlet or outlet ports. Of course, one of ordinary skill in the art will recognize that the inlet ports 102 and 104 and the outlet port 106 may be known as fluid apertures.

The inlet port 102 and the outlet port 106 are disposed opposite each other and may be disposed along a common flow axis or at least respective parallel flow axes. The inlet port 104 and the opening 108 are also disposed opposite to each other and may be aligned along a common axis or have parallel axes. Each of the inlet port 104 and the opening 108 is disposed at an angle to the inlet port 102 and the outlet port 106. In the example valve body 100 of FIG. 1, the inlet port 102 and the outlet port 106 are substantially orthogonally oriented with respect to the inlet port 104 and the opening 108.

Each of the openings 102, 104, 106, and 108 may include a respective internally threaded portion 110, 112, 114, and 116. In some examples, the internally threaded portions 110, 112, and 114 may be standard pipe threads sized to accommodate a particular pipe diameter such as, for example, one inch pipe and/or fittings. The internally threaded portion 116 of the opening 108 may be sized to accept a bonnet assembly suitable for implementing a particular type of valve. Of course, one of ordinary skill in the art will recognize that opening 108 may not include the internally threaded portion 116, but may instead include any other suitable structure to attach the bonnet assembly to the valve body.

A distal end 118 of the inlet port 104 includes a threaded portion 120 configured to engage with a threaded aperture of a vessel such as that shown and described in connection with FIG. 4 below. In this manner, the threaded portion 120 enables the example valve body 100 and, thus, any valve implemented therewith, to be mounted or mechanically fastened directly to a vessel. Alternatively or additionally, the inlet port 102 and the outlet port 106 may also include respective externally threaded portions for engagement with a threaded portion of a vessel or the like.

As described in greater detail below, one or more of the ports 102, 104, and 106 may be configured to receive a plug or cap to configure the example fluid valve body 100 as a tee valve, a globe valve, an angle valve, or vessel mounted valve. Additionally, those of ordinary skill in the art will recognize that the example fluid valve body 100 is merely an example embodiment and that variations in the actual valve body may be implemented. For example, the number of openings, the physical layout or relationship of the openings, number of openings bearing external threading, and relative sizes of the openings may vary depending on the intended use. Still further, the example valve body 100 may utilize any desired internal flow paths (e.g., curved flow paths that minimize turbulence to prevent or minimize cavitation and/or other potentially destructive or noise generating effects). Also, for clarity, the example valve body 100 is depicted in FIG. 1 without valve trim. However, those of ordinary skill in the art should recognize that any desired valve trim could be installed in the example valve body 100 to suit particular applications.

Figure 2:
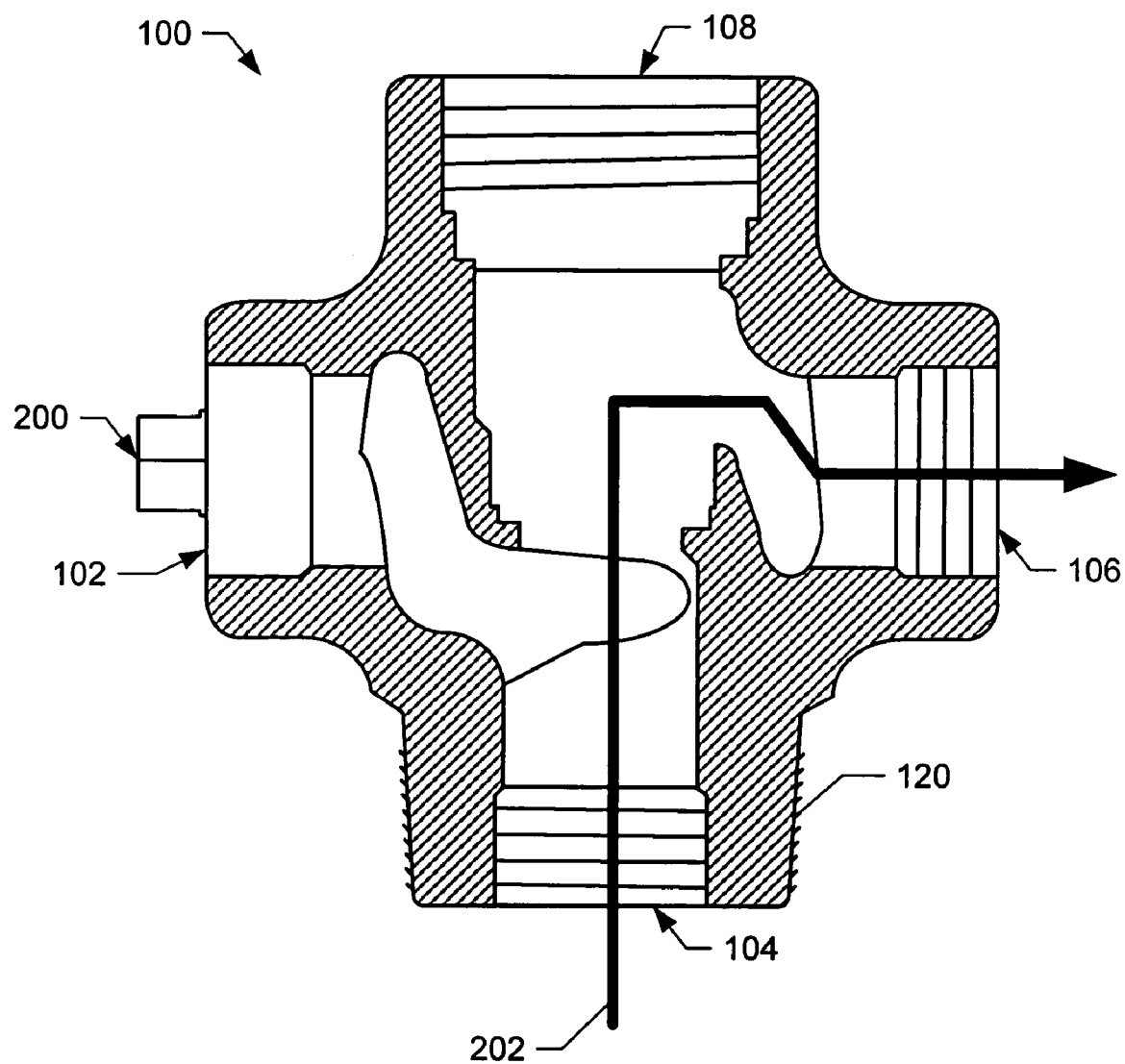
FIG. 2 is a cross-sectional view of the example valve body of FIG. 1 in an angle valve configuration.

FIG. 2 is a cross-sectional view of the example valve body 100 of FIG. 1 in an angle valve configuration. As shown in FIG. 2, a threaded cap or plug 200 is installed in the inlet port 102. The cap or plug 200 blocks fluid from flowing into or out of the inlet port 102. If a bonnet assembly is mounted to the opening 108, then the inlet port 104 and the outlet port 106 define an angled flow path 202 through the valve body 100. When configured as shown in FIG. 2, the example valve body 100 may be directly mounted to a vessel via the externally threaded inlet port 104 and the outlet port 106 may be coupled to a pipe and/or any other fitting or fluid carrying structure.

Figure 3:
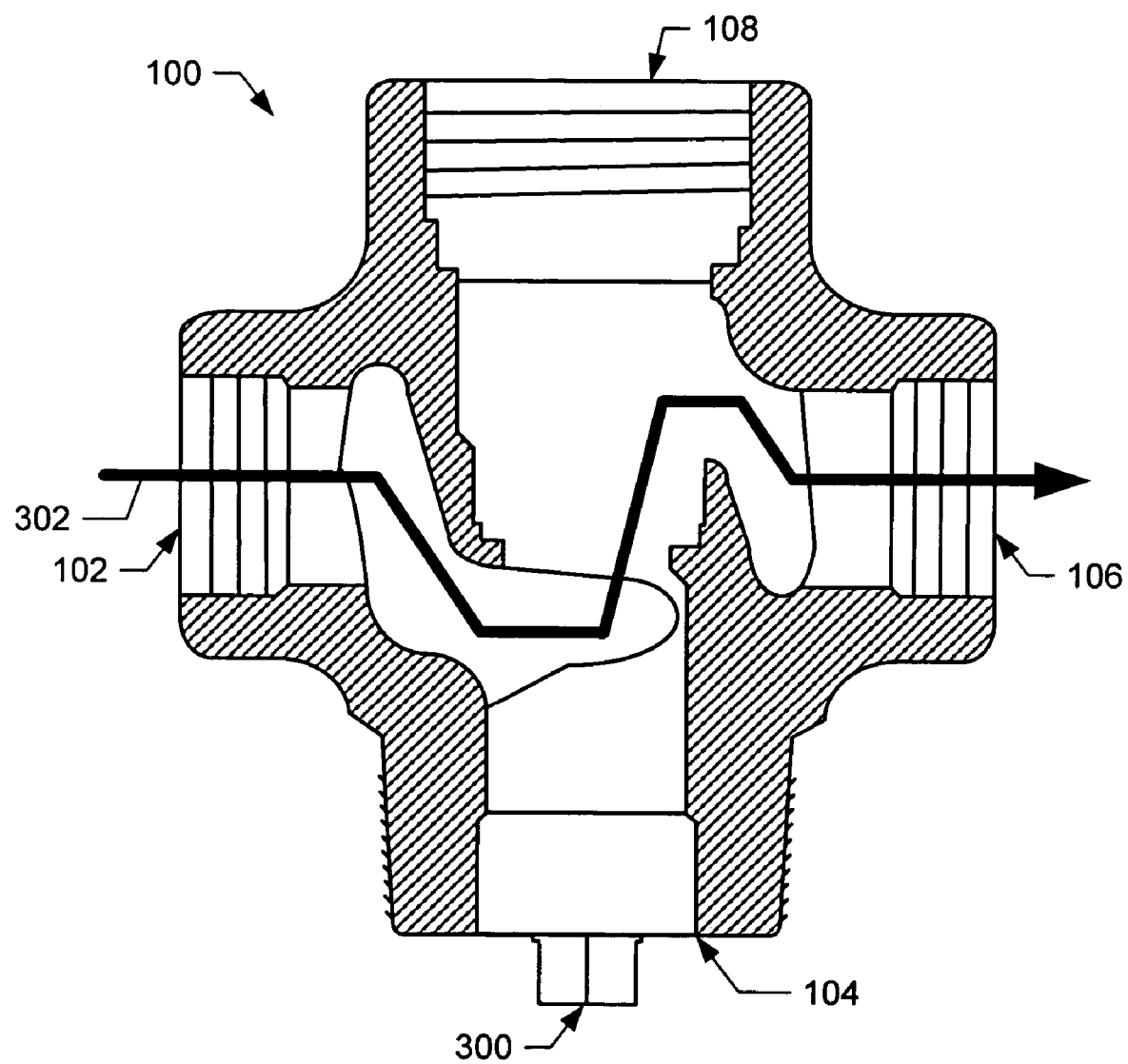
FIG. 3 is a cross-sectional view of the example valve body of FIG. 1 in a globe valve configuration.

FIG. 3 is a cross-sectional view of the example valve body 100 of FIG. 1 in a globe valve configuration. As shown in FIG. 3 a plug 300 in inserted or installed in the inlet port 104. Additionally, a bonnet assembly may be mounted via the opening 108. Thus, in this configuration, a flow path 302 conveys fluid between the inlet port 102 and the outlet port 106.

Figure 4:
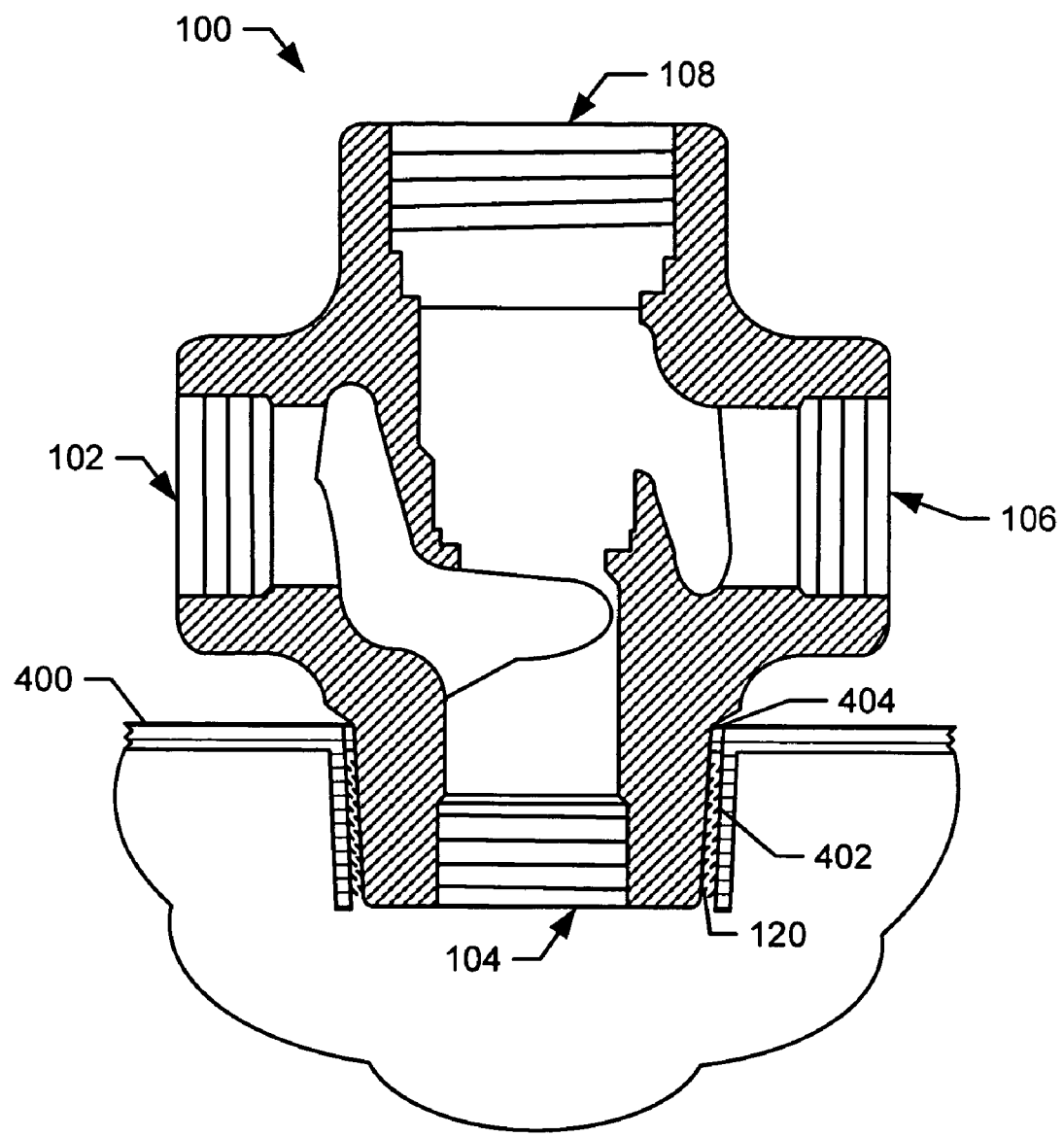
FIG. 4 is a cross-sectional view of the example valve body of FIG. 1 depicted in a vessel mounted configuration.

FIG. 4 is a cross-sectional view of the example valve body 100 of FIG. 1 depicted in a vessel mounted. As depicted in FIG. 4, the example valve body 100 is mounted directly to a vessel 400. In particular, the threaded portion 120 of the inlet port 104 is threadingly engaged with threads 402 of an aperture 404 of the vessel 400. Although not shown in FIG. 4, a bonnet assembly may be mounted to the opening 108 and a plug or cap may be installed or inserted in one of the inlet port 102 or the outlet port 106. As can be seen from the example configuration of FIG. 4, the ability to mount the example valve body 100 in a vessel via the externally threaded inlet port 104 eliminates the need for supplementary connections and piping. Additionally, the example configuration of FIG. 4 requires less physical space (e.g., clearance or height) than required by known vessel mounted assemblies.

Although certain apparatus and articles of manufacture have been described herein, the scope of coverage of this patent is not limited thereto. To the contrary, this patent covers all apparatus and articles of manufacture fairly falling within the scope of the appended claims either literally or under the doctrine of equivalents.

What is claimed is:

1. A fluid control valve body comprising:
   opposing first and second openings, wherein at least one of the first and second openings are inlet ports;
   opposing third and fourth openings, wherein each of the third and fourth openings is disposed at a respective angle to at least one of the first and second openings, and wherein one of the third and fourth openings is configured to enable the fluid control valve body to be mounted directly to a vessel; and
   a plug installed in an internally threaded portion of the fourth opening that is configured to enable the fluid control valve body to be mounted directly to a vessel, wherein the fourth opening includes an externally threaded portion adjacent the internally threaded portion and configured to engage a threaded portion of the vessel.

2. The fluid valve control body as defined in claim 1, wherein the third opening is an outlet port.

3. The fluid valve control body as defined in claim 1, wherein the third opening is configured to be coupled to a bonnet assembly.

4. The fluid valve control body as defined in claim 1, wherein a distal end of the one of the third and fourth openings is configured to mechanically fasten the fluid valve control body to the vessel.

5. The fluid valve control body as defined in claim 1, wherein the first, second, third, and fourth openings are configured to enable the fluid control valve body to be used in a globe valve configuration, an angle valve configuration, or a vessel mounted valve configuration.

6. The fluid control valve body as defined in claim 1, wherein each of the opposing first and second openings includes a respective internally threaded portion.

7. The fluid control valve body as defined in claim 6, wherein each of the internally threaded portions includes pipe threads.

8. The fluid control valve body as defined in claim 1, wherein each of the opposing third and fourth openings includes a respective internally threaded portion, and wherein the one of the third and fourth openings includes an externally threaded portion configured to engage a threaded portion of the vessel.

9. A fluid valve body, comprising:
   a first fluid aperture including a first internally threaded portion;
   a second fluid aperture including a second internally threaded portion and fluidly coupled to the first fluid aperture;
   a plug installed in the second internally threaded portion of the second fluid aperture;
   a third fluid aperture fluidly coupled to the first and second apertures; and
   a fourth aperture including a fourth internally threaded portion and fluidly coupled to the first, second, and third apertures, wherein the fourth aperture is adjacent an externally threaded portion of the fluid valve body that is configured to threadingly couple to a fluid vessel.

10. The fluid valve body as defined in claim 9, wherein at the third fluid aperture includes an internally threaded portion.

11. The fluid valve body as defined in claim 9, wherein at least one of the first, second, third, and fourth apertures is configured to receive a plug to configure the fluid valve body as a globe valve, an angle valve, and a vessel mounted valve.

12. The fluid valve body as defined in claim 9, wherein at least two of the internally threaded portions are compatible with standard pipe threads.

13. The fluid valve body as defined in claim 9, wherein the externally threaded portion is compatible with standard pipe threads.

14. The fluid valve body as defined in claim 9, wherein the externally threaded portion is disposed at a distal end of the fluid valve body associated with the fourth aperture.

* * * * *